United States Patent Office 3,661,879
Patented May 9, 1972

3,661,879
PROCESS FOR THE POLYMERIZATION OF N-VINYLCARBAZOLE IN THE PRESENCE OF 2,4,5,7-TETRANITRO-9-FLUORENONE
Max Van Dam, Oradell, and Diana S. Y. Yung, Park Ridge, N.J., assignors to Ing. C. Olivetti & C., S.p.A., Ivrea, Italy
No Drawing. Filed Apr. 6, 1971, Ser. No. 131,827
Int. Cl. C08f 7/16
U.S. Cl. 260—88.3 R — 7 Claims

ABSTRACT OF THE DISCLOSURE

N-vinylcarbazole is polymerized catalytically using 2,4,5,7-tetranitro-9-fluorenone as the polymerization catalyst. The reaction is carried out under elevated temperature conditions. The resulting polymer-fluorenone composition is useful in the preparation of photoconductive plates used in the electrostatic duplicating field.

BACKGROUND OF THE INVENTION

This invention relates to the production of poly(N-vinylcarbazole) and more particularly to the production of poly(N-vinylcarbazone) photoconductor compositions. Specifically, it relates to the catalytic polymerization of N-vinylcarbazole using 2,4,5,7-tetranitro-9-fluorenone as a catalyst.

Poly(N-vinylcarbazole) is a material widely used in the preparation of electrostatic photoconductive plates for use in the duplicating field. The material is of itself not a desirable photoconductor but when modified by the presence of varying amounts of, for example, an electron affinitive compound such as chloranil, tetrabromophthalic anhydride or a fluorenone such as trinitro or tetranitro fluorenone, there results a charge transfer complex which is suitable for use in a photoconductive plate.

In the art it is common first to prepare the polymeric N-vinylcarbazole from the monomer and then to blend the polymer with a desirable amount of the electron affinitive compound. Most commonly employed is 2,4,7-trinitro-9-fluorenone as the electron affinitive material. The electron affinitive compound is thought to enhance the photoconductive effect of the polyvinylcarbazole by becoming more negative upon photoexcitation of the polymer. 2,4,5,7-tetranitro-fluorenone has also been used as a blending material to enhance the photoconductive effect of the polyvinylcarbazole but it has not been commercially suitable due to reasons of economy.

The above art process is disadvantageous in several respects. First off, monomeric N-vinylcarbazole must be catalytically polymerized if it is to be economically produced. Polymerization without a catalyst, via thermal means for example, is simply too time consuming, usually requiring weeks or months for effective polymer production. The use of an external catalyst is therefore required and this in and of itself raises significant problems in the subsequent manufacture of the charge transfer complex. This is for the reason that the commonly employed catalysts used in the polymerization process, i.e., ditertiary butyl peroxide, azobisisonitrile, azodiisobutyronitrile, $\beta$-naphthol, monoethyl aluminum dichloride and the like must be removed from the vinylcarbazole polymer before blending the polymer with the auxiliary electron affinitive compound. This requires time consuming and expensive washing and solvent extraction steps which add significantly to the cost of the final photoconductive material. Additionally, specific catalysts give rise to peculiar problems of their own when employed in the polymerization process. For example, the use of peroxides, especially ditertiary butyl peroxide, causes extensive foaming during polymeriaztion and this can be an expensive factor to control.

DETAILED DESCRIPTION OF THE INVENTION

The present invention is based on the discovery of a new catalyst for the polymerization of N-vinylcarbazole. The new catalyst is 2,4,5,7-tetranitro-9-fluorenone. In addition to being able to catalyze the carbazole, it also is a sufficient electronegative material that its presence in the polymer at the higher levels employed in polymer production results in a composition which is suitable as a photoconductive material for use in electrostatic duplicating processes as a plate coating material. Indeed, as had been stated above, the tetranitrofluorenone has in the past been used as a component with already polymerized N-vinylcarbazole but is too expensive to be of any commercial significance. The compound, however, has not heretofore been known as a catalyst for the carbazole polymerization nor used under circumstances under which it could so function. Notwithstanding the expense of the tetranitro compound, the essence of the invention is such that when the compound is used as a catalyst for the polymerization no intermediate purification steps are required. The final product is thus directly usable to prepare photoconductive plates in a manner known in the art. Any unpolymerized monomer is readily and preferably removed from the composition by solvent extraction, as will be explained below.

According to the process of the present invention, N-vinylcarbazole is polymerized in the presence of a catalytic amount of 2,4,5,7-tetranitro-9-fluorenone by heating the mixture at an elevated temperature for a time sufficient to effect polymerization. This time will vary depending on the temperature and the amount of the fluorenone used. In general, however, polymerization is substantially complete in from 2 to 60 minutes when the conditions hereinafter described are employed.

The polymerization process may be conducted in the presence or absence of a solvent. When a solvent is employed it is convenient to use tetrahydrofurfuryl alcohol. It is most preferred, however, to use no solvent at all but rather to utilize the carbazole itself, which is a liquid under the reaction conditions, as the vehicle for the reaction.

In practicing the process of the invention, the carbazole and the fluorenone are heated to an elevated temperature, suitably ranging from the melting point of the carbazole (about 60° C. at atmospheric pressure) to about 200° C., preferably from 60–175° C. and most preferably from 60 to 165° C. The reaction may be conducted at atmospheric pressure although superatmospheric pressures of the order of 40 atmospheres or more may be employed if desired.

The amount of 2,4,5,7 - tetranitro - 9 - fluorenone used to catalyze the polymerization will vary depending on a variety of factors such as the temperature conditions employed in the reaction and the amount desired in the final product in terms of the photoconductive properties of the mixture. For example, mixtures of poly(N-vinylcarbazole) and 2,4,5,7 - tetranitro - 9 - fluorenone wherein the fluorenone is present in amounts ranging from .1 to 20% and preferably .1 to 5% of the weight of polymer present are suitable photoconductive materials. These amounts of fluorenone are more than sufficient to produce an adequate and desirable catalytic effect for polymerization purposes when temperatures in the ranges recited above are employed for the polymerization. It is preferred that the polymerization reaction can be conducted with only a portion of the amount of tetranitrofluorenone ultimately desired in the final product and the remainder added after the reaction is complete.

The catalytic effect of the tetranitrofluorenone is observed at quite low levels of the order of 0.1% (of the weight of polymer) and lower. The time-temperature relationship attending the polymerization reaction is such that at low catalyst levels temperatures on the higher side are suitably employed. In conducting the process of the invention it is also possible to use in the polymerization reaction a quantity of tetranitrofluorenone which is ultimately desired in the final product. A photoconductive solid of suitable properties is thereby directly obtained. This avoids the use of low, albeit catalytically effective, levels of the fluorenone in the polymerization reaction and obviates addition of the remainder of the fluorenone after polymerization. Moreover, the use of higher amounts of the tetranitrofluorenone, of the order of 8 to 12% (based on the weight of monomer supplied) accelerates the polymerization reaction at elevated temperature conditions and the final product has suitable photoconductive properties. For example, reaction times of two minutes are routinely obtained at a reaction temperature of about 165° C. using the fluorenone at a level of about 10% by weight of the monomer.

In the preferred mode of practicing the invention, the monomeric N-vinylcarbazole is melted and heated to the desired temperature. Thereafter, the 2,4,5,7 - tetranitro-9-fluorenone is added and the reaction mixture held under the polymerization conditions until sufficient polymerization has occurred. This may be followed simply by observing the increase in viscosity, sufficient polymerization having been effected when difficulty in stirring is encountered. Ordinarily the degree of polymerization ranges from 50 to 75% of polymerized monomer within 2 to 80 minutes using the preferred conditions of the invention. The extent of polymerization can be determined by those skilled in the art depending on the physical properties desired in the final material. The amount of polymerization above referred to is ordinarily suitable since it leads to final compositions having the desired relative proportions of polymeric carbazole and the tetranitrofluorenone.

As a result of the invention, the final product is obtained generally as a dark brown solid which is a physical complex of the two materials. This material is then preferably treated to remove therefrom any unpolymerized N-vinylcarbazole. This is conveniently achieved by dissolving the entire reaction mass in a suitable solvent such as tetrahydrofuran, tetrahydrofurfuryl alcohol, ethylene dichloride and the like and then pouring the solution into an additional solvent in which the monomer is soluble but the complex is insoluble. Suitable for this purpose are hydrocarbons such as Isopar G and the lower alkanols such as methanol, ethanol, isopropanol, butanol and the like. Methanol is preferred. The precipitated complex is then washed and dried and is ready for fabrication into photoconductive plates. For example, it can be dissolved in an appropriate solvent and used to coat the plates according to well known techniques.

The following examples illustrate specific embodiments of the present invention.

Example 1

10 gms. of N-vinylcarbazole is melted at 65° C. and 1 gm. of 2,4,5,7 - tetranitro - 9 - fluorenone added thereto with stirring. The mixture is then heated for 60 minutes at 65° C. during which time the reaction mass becomes so viscous as to make stirring difficult thus indicating a sufficient degree of polymerization.

The polymerized mass is then dissolved in 100 ml. of tetrahydrofuran. Thereafter the solution is poured into 2 liters of methanol to precipitate the polyvinylcarbazole-fluorenone complex leaving unpolymerized N-vinylcarbazole monomer in the methanol solution. The complex is next washed once with 50 ml. of methanol and dried. The product has suitable photoconductive properties for use in electrostatic photoconductive plates.

Examples 2-7

The procedure of Example 1 is followed using the quantity of 2,4,5,7 - tetranitro - 9 - fluorenone shown in the table at the temperature and for the time indicated to achieve the same degree of polymerization.

| Example | Amount of fluorenone (as percent of carbazole monomer) | Temperature (° C.) | Polymerization time |
| --- | --- | --- | --- |
| 2 | 0 | 60 | 2 months. |
| 3 | 0 | 100 | 75 hours. |
| 4 | 10 | 60 | 20–60 minutes. |
| 5 | 0.1 | 140 | 60–80 minutes. |
| 6 | 10 | 165 | 2–8 minutes. |
| 7 | 0.5 | 140 | 1–2 hours. |

Using the lower times the mixture solidifies, but after longer times the melting point increases showing increased polymerization.

Examples 2 and 3 show the extremely long length of time required for thermal polymerization, without the addition of a catalyst. Contrasted to this, Example 4 shows that with only 10% of the tetranitrofluorenone added the polymerization time at the same temperature (60° C.) is decreased from 2 months (Example 2) to 20–60 minutes. This time is even further reduced to 2–8 minutes at 165° C. (Example 6). Example 5 shows that even at low levels of tetranitrofluorenone (0.1%) the catalytic effect is pronounced. The material produced in Example 5 should be supplemented with additional tetranitrofluoroenone to enhance the photoconductive properties of the complex.

What is claimed is:

1. The process for polymerizing N-vinylcarbazole which comprises heating the N-vinylcarbazole in the presence of a catalytically effective amount of 2,4,5,7-tetranitro-9-fluorenone at an elevated temperature.

2. The process of claim 1 wherein the amount of said fluorenone employed ranges from .1 to 20% by weight based on the weight of N-vinylcarbazole employed.

3. The process of claim 2 wherein the elevated temperature is within the range of 60° C. to 200° C.

4. The process of claim 3 wherein the amount of said fluorenone employed ranges from .1 to .5% based on the weight of N-vinylcarbozole employed.

5. The process of claim 4 further including the step of adding additional 2,4,5,7 - tetranitro - 9 - fluorenone at an elevated temperature in an amount from 0 to 100% based on the weight of the N-vinylcarbazole.

6. The process of claim 1 wherein the polymerization is carried out in the absence of an externally added solvent.

7. A composition comprising monomeric N-vinylcarbazole and from .5 to 100% of 2,4,5,7 - tetranitro-9-fluorenone based on the weight of said N-vinylcarbazole.

References Cited

UNITED STATES PATENTS 3,287,123  11/1966  Hoegl _____ 96—1.5

OTHER REFERENCES

Jones (Defensive Publication), search copy of Ser. No. 30,226, filed Apr. 20, 1970, published in 881 O.G. 21, on Dec. 1, 1970, Defensive Publication No. T881,002, class 96, subclass 1.5.

HARRY WONG, JR., Primary Examiner

U.S. Cl. X.R.

96—1.5